United States Patent [19]

Irie et al.

[11] Patent Number: 4,542,322
[45] Date of Patent: Sep. 17, 1985

[54] PICTURE IMAGE DISPLAY APPARATUS

[75] Inventors: Hiroyuki Irie, Osaka; Susumu Ide, Katano; Kinzo Nonomura, Hirakata; Masanori Watanabe, Katano; Yoshinobu Takesako, Neyagawa, all of Japan

[73] Assignee: Matsushita Electric Industrial Co., Ltd., Kadoma, Japan

[21] Appl. No.: 602,086

[22] Filed: Apr. 19, 1984

Related U.S. Application Data

[63] Continuation of Ser. No. 250,712, Apr. 3, 1981, abandoned.

[51] Int. Cl.⁴ .................. H01J 29/70; H01J 29/72
[52] U.S. Cl. .................... 315/366; 313/422
[58] Field of Search ............ 315/366; 313/422; 358/67, 68

[56] References Cited

U.S. PATENT DOCUMENTS 2,900,562  8/1959  Burns, Jr. .................. 358/68
4,227,117 10/1980  Watanabe et al. .......... 315/366

FOREIGN PATENT DOCUMENTS 55-33734  3/1980  Japan.

Primary Examiner—Theodore M. Blum
Attorney, Agent, or Firm—Cushman, Darby & Cushman

[57] ABSTRACT

A picture image display apparatus has a flat type vacuum enclosure having a transparent face panel. A row of parallelly disposed linear thermionic cathodes are provided with an electron beam extractor electrode which produces a predetermined number of two dimensionally disposed electron beams out of the electron emission from the linear thermionic cathodes. A row of control electrodes is disposed parallelly in a direction perpendicular to those of the linear thermionic cathodes. A row of vertical deflection electrodes and a row of horizontal deflection electrodes are provided. A phosphor screen formed on the inner force of the face panel has an anode of thin metal film formed on its surface. A horizontal deflection signal generator issues a horizontal deflection signal having, in 1 cycle, a first scanning period wherein voltage increases and a second scanning period of the same length wherein voltage decreases. In both of the first and second scanning periods control signals are applied to the control electrodes to produce image spots in both scanning periods.

13 Claims, 16 Drawing Figures

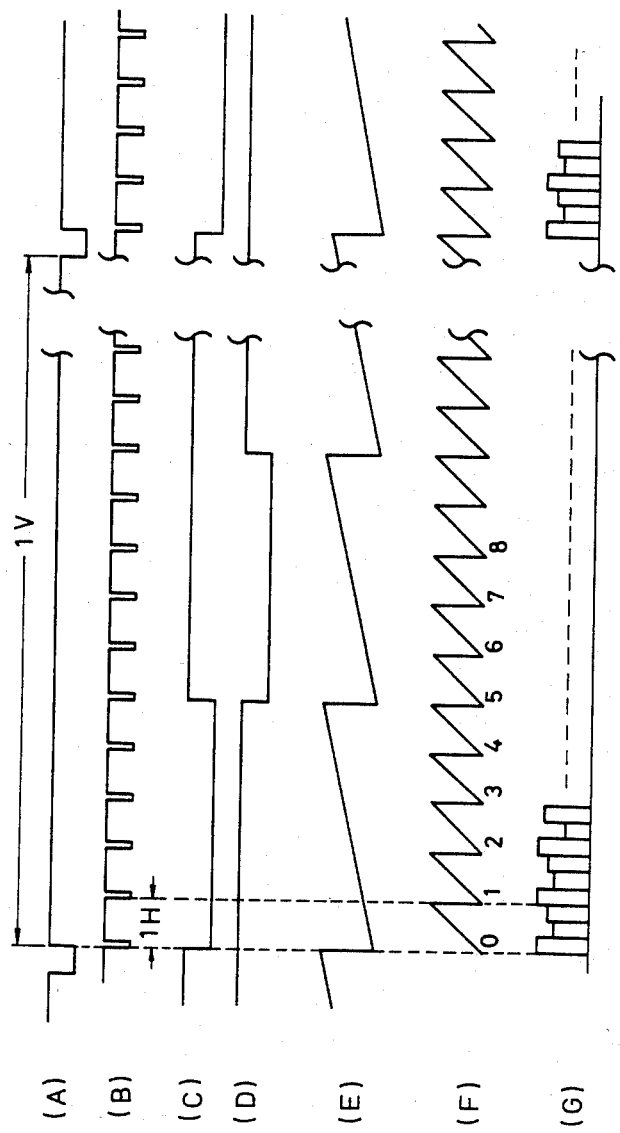

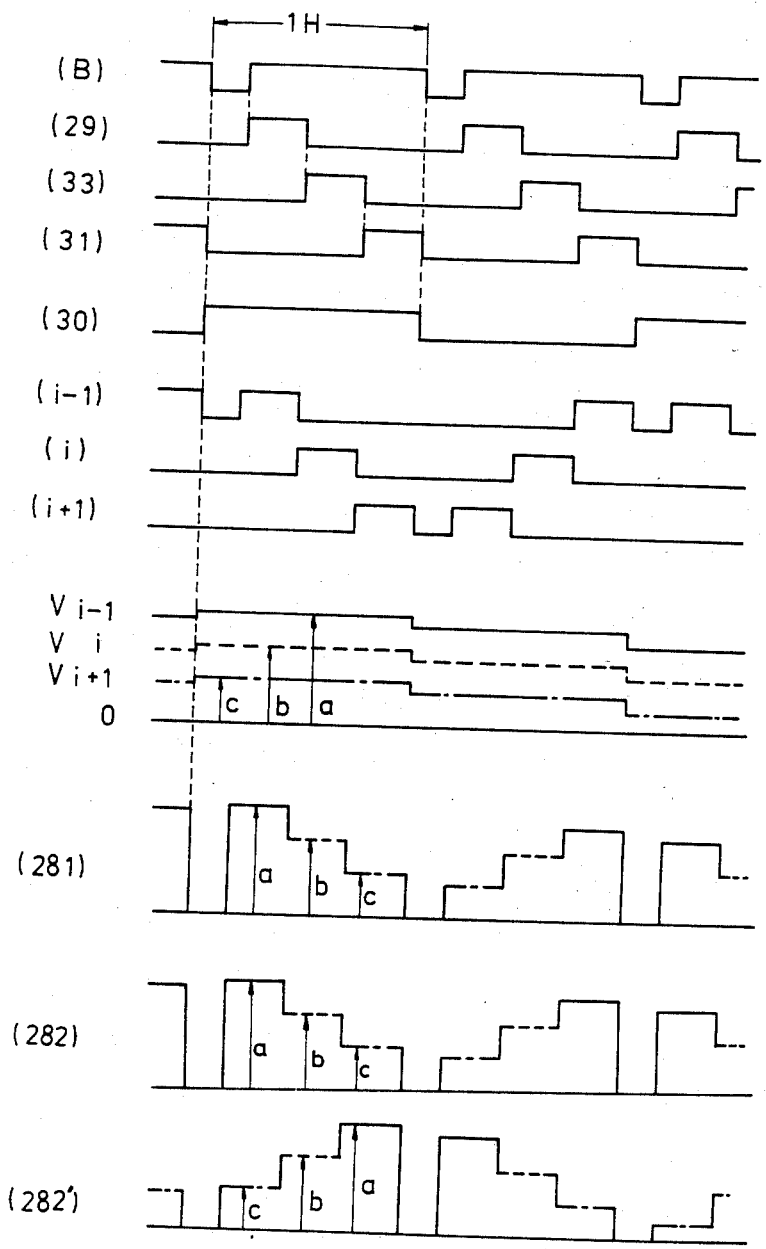

PICTURE IMAGE DISPLAY APPARATUS

This is a continuation, of application Ser. No. 250,712, filed Apr. 3, 1981, now abandoned.

BACKGROUND OF THE INVENTION

1. Field of the Invention

The present invention relates to an improvement of a picture image display apparatus and especially concerns a picture image display apparatus having a novel manner of scanning.

2. Description of the Prior Art

Three of the inventors of the present invention have invented and proposed a multiple electron beam type picture display apparatus described in the specification of the Japanese patent application Sho No. 53-106788 filed on Aug. 30, 1978 and also described in the specification of the U.S. Pat. No. 4,227,117 patented on Oct. 7, 1980. The apparatus described in the above-mentioned Japanese patent application and the U.S. Patent comprises in a flat type vacuum enclosure a row of parallelly disposed linear thermionic cathodes (i.e., line cathodes, each of which comprises a linear filament line to be heated by a low voltage, e.g., D.C. 10V and electron emissive oxide coating thereon, and hereinafter is referred to as linear thermionic cathode), electron beam forming electrodes, a row of control electrodes parallelly disposed in a direction perpendicular to those of the thermionic cathodes, a row of vertical deflection electrodes, a row of horizontal deflection electrodes, a phosphor screen formed on a face panel and an anode layer formed on the phosphor screen.

In the operation of such multiple electron beam type display apparatus described in the abovementioned specifications, scannings of beam spots on the phosphor screen are made in the known line-at-a-time type scanning, wherein an ordinary time-sequential image signal is converted into a plural number of parallel signals. For example, by taking a case to display an image field raster having numbers of picture elements of 240 (in vertical direction) times 321 (in horizontal direction), with regard to the horizontal scanning of the beam spots the raster is divided into a plural number N of vertically oblong sections, wherein the horizontal scannings are carried out parallelly in all of N sections. Then, each section has picture elements of n=321/N in the horizontal direction. For example, when the number N of the vertical sections is 107, the number n of picture element in each section is 3. For such example, 107 beam spots are produced from each linear thermionic cathode and 107 control electrodes are provided in order to control the 107 electron beam intensities. In the apparatus, the horizontal scanning is made by using a saw-tooth wave having a horizontal scanning period H applied to the horizontal deflection electrode and in a manner that all the N beam spots are deflected simultaneously to scan in the same direction taking one horizontal scanning period H. The horizontal scanning period H is equal to the horizontal scanning period of the ordinary time sequential television signal. In order for attaining such line-at-a-time-scanning, the ordinary time sequential image signal is preliminarily converted into the N parallel signals of the line-at-a-time type.

The vertical scanning of the described apparatus is made by dividing the raster into a plural number M of horizontally oblong sections, and at first in the first section, for example in the uppermost section, the plural number of beam spots, which simultaneously scan, also scan vertically (downwards). When the vertical scanning in the first section is over and all the beam spots reach the bottoms of the first horizontally oblong sections, then the forming of electron beams from the electron from the first linear thermionic cathode ends and the forming of electron beams from the electrons from the second linear thermionic cathode starts, and the vertical scannings of the beam spots start in the second horizontally oblong section and scan downwards in the same way as in the first section. The vertical scanning is made thus downwards to the bottom or M-th section by applying a saw-tooth wave having a period V/M, where V is the vertical scanning period of the ordinary television signal. For the abovementioned example of the raster having the number of vertical picture element of 240, when the number M of the horizontally oblong sections is 48, each of the section has the horizontal scanning lines of a number of m=240/48=5. That is to say, the example apparatus uses 48 linear thermionic cathodes, and each cathode vertically scans to produce 5 horizontal scanning lines.

FIG. 1 shows a block diagram of an example of the circuit for driving the abovementioned apparatus described in the abovementioned specifications. The circuit of FIG. 1 is constituted as follows. A video signal from the input terminal 12 is led to a video signal amplifier 13 and a synchronization signal separator 14, the output of which is given to a sampling pulse generator 15 and a synchronization signal generator 19. A memory circuit 16 receives a time sequential signal from the video amplifier 13 and sample-holds it in order for conversion to the parallel type video signal by a multiplexer circuit 17. That is the multiplexer circuit 17 takes out a memorized video signal from the memory 16 and rearranges it into the N (=107) parallel signals, in each of which n (=3) data in the memory 16 are rearranged into time sequential signal to take the time period of H. The parallel outputs of the multiplexer circuit 17 are given through amplifiers 18 to the control electrodes of the display apparatus. Horizontal deflection signal generator 20 and vertical deflection signal generator 22 receive a signal from the synchronization signal generator 19 and issue a horizontal deflection signal and vertical deflection signal through the amplifiers 21 and 23 to the horizontal deflection electrodes and vertical deflection electrodes of the display apparatus, respectively. A cathode control circuit 24 receives a signal from the synchronization signal generator and issues a control signal to the linear thermionic cathodes, in order that electron beams are selectively formed from the electrons from a selected linear thermionic cathodes in sequence by application of negative potential with respect to the electrode 3 thereto, thereby to scan for the period of m×H.

FIG. 2 shows waveforms (A), (B), (C), (D), (E), (F) and (G) of various parts of FIG. 1 circuit for the example of n=3 and m=5. The waveforms (A) and (B) are those of horizontal synchronization signal and vertical synchronization signal, wherein H shows the time period of one horizontal scanning and V shows the time period of one vertical scanning of the ordinary television signal. The waveforms (C) and (D) are voltages to be applied to the first and the second linear thermionic cathodes, respectively for switchingly operating the cathodes in sequence. The waveforms (E) and (F) are issued from the vertical deflection signal generator circuit 22 and horizontal deflection signal generator circuit 20, respectively, and the waveform (G) is the control signal to be applied to the control electrode 4 of the display apparatus. Accordingly, the scannings of the beam spots seen at enlarged parts of the phosphor screen is as shown in FIG. 10(a).

The circuit of FIG. 1 uses saw-tooth shape signals for the horizontal deflection as shown by FIG. 2 (E). The horizontal deflection electrodes comprise, for example, in the abovementioned example apparatus 107 pairs (i.e., 214 rods), of vertically oblong electrodes and hence the horizontal electrode has such a large inter-electrode capacitance of several hundred pF. Accordingly, to drive such electrodes with a large capacitance with the saw-tooth wave signal has a great difficulty of requiring such a high voltage signal of 100 to 200 volts and a considerable large power in order to ensure sufficiently short retracing period necessary for accurate horizontal scanning, and accordingly requiring such expensive circuit of emitter follower circuit or single-ended push-pull circuit.

SUMMARY OF THE INVENTION

The present invention has as its object to provide a novel improved picture image display apparatus capable of accurate horizontal scanning with smaller driving power and a cheaper circuit.

The present invention further can provide a picture image display apparatus of more simple configuration than hitherto proposed ones.

BRIEF EXPLANATION OF THE DRAWINGS

FIG. 2 is a waveform chart showing waveforms of signals at various parts of the circuit of FIG. 1.

FIG. 6 is a waveform chart of signals of the example circuit.

DESCRIPTION OF THE PREFERRED EMBODIMENTS

The picture image display apparatus in accordance with the present invention comprises:

a flat type vacuum enclosure having a transparent face panel, a row of parallelly disposed linear thermionic cathodes, electron beam extractor electrode which produces a predetermined number of two dimensionally disposed electron beams out of the electron emission from said linear thermionic cathodes, a row of control electrodes disposed parallelly in a direction perpendicular to those of said linear thermionic cathodes, a row of deflection electrodes, a phosphor screen formed on the inner face of said face panel, an anode of thin metal film formed on said surface of said phosphor screen, a deflection signal generator which issues a deflection signal to be applied to said deflection electrodes, and circuits for producing control signals to be applied to said control electrodes, said circuits comprising a memory for storing a video signal and a multiplexer for converting said stored video signal into parallel signals for said control electrodes, wherein the improvement is that said deflection signal generator issues a deflection signal comprising a first scanning period wherein voltage increases and a second scanning period wherein voltage decreases, in both of said first scanning period and second scanning period said control signals being applied to said control electrodes to produce image spots in both scanning periods.

Figure 3A:
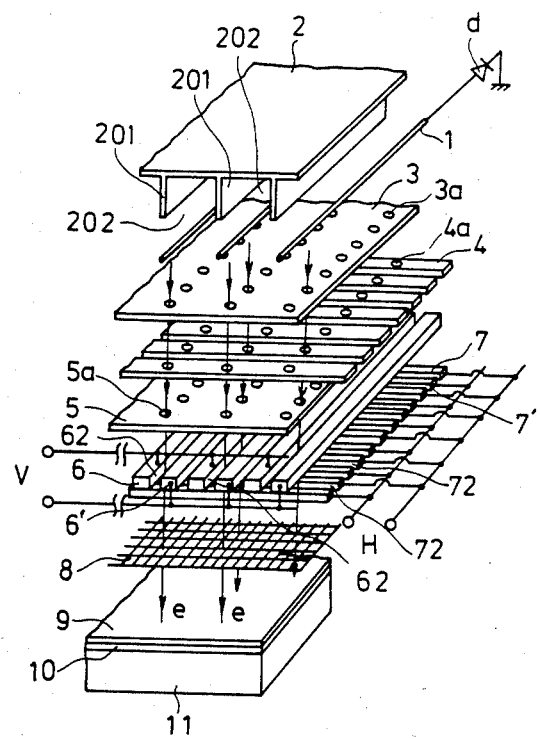
FIG. 3(a) is an exploded perspective view showing the principal part of a display apparatus embodying the present invention.

An example of the picture image display apparatus embodying the present invention is shown in FIG. 3(a) which is an exploded view of the principal part of the apparatus. The apparatus comprises, as shown from the upper part to the lower part in FIG. 3(a), and FIG. 3(b), an isolation electrode 2 having a plural number of isolation walls 201 to define oblong isolated spaces 202, a row of predetermined number M (e.g., M=48) of parallel disposed linear thermionic cathodes 1 each being disposed in the isolated spaces 202, an extractor electrode 3 having a predetermined number N (e.g., N=107) of electron beam passing apertures 3a disposed under the linear thermionic cathodes 1, a row of control electrodes for controlling beam intensity disposed parallelly in a direction perpendicular to those of said linear thermionic cathodes 1 each having electron beam passing openings 4a under the apertures 3a, an electron beam extractor electrode 5 having electron beam passing openings 5a under the openings 4a, a row of vertical deflection electrodes comprising pairs of common-connected first electrodes 6 and common-connected second electrodes 6', a row of horizontal deflection electrodes comprising pairs of common-connected first electrodes 7 and common-connected second electrodes 7', an electric field shielding electrode 8, an anode 9 of vapor-deposited thin aluminum film, and a phosphor screen 10 formed on a face panel 11 of a vacuum enclosure. Every electron beams e, e . . . pass through deflection spaces 62, 62 . . . and 72, 72 . . . defined by the deflection electrodes pair 6, 6' . . . and 7, 7' . . . disposed regularly in the same order with respect to every electron beams as shown in FIG. 3(a) and FIG. 3(b).

Figure 3B:
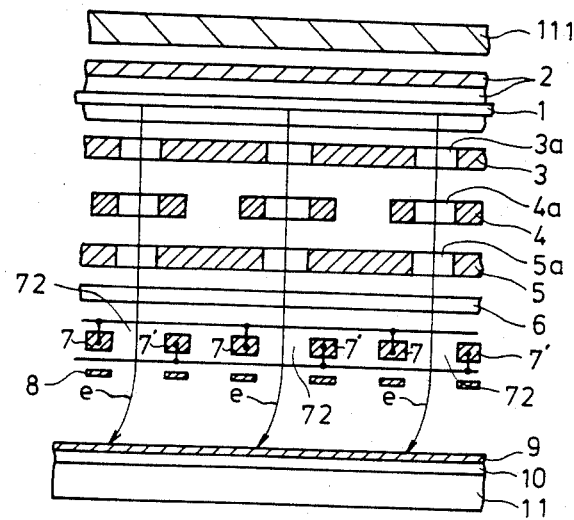
FIG. 3(b) is a sectional view of the apparatus of FIG. 3(a).
Figure 5:
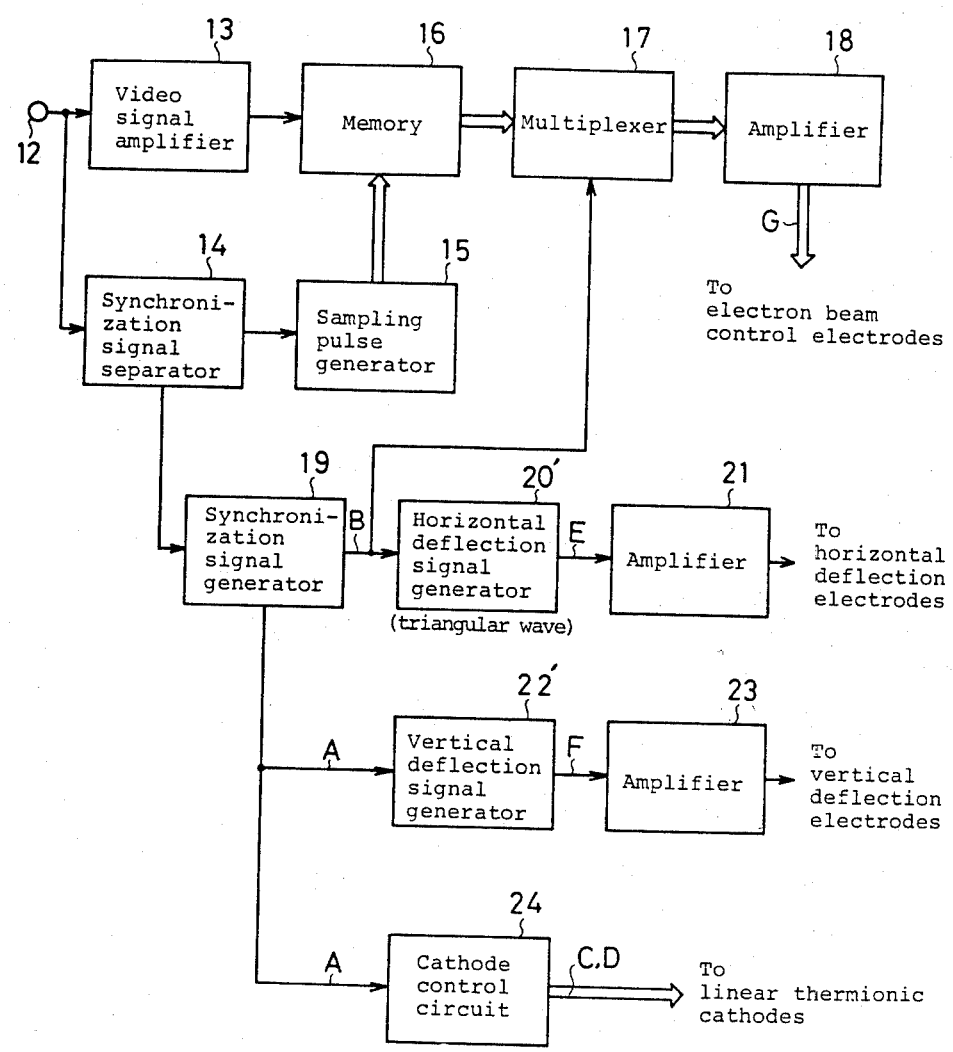
FIG. 5 is a circuit diagram of the apparatus embodying the present invention.

FIG. 5 shows a block diagram of an example of the circuit for driving the abovementioned apparatus of FIG. 3(a) and FIG. 3(b). The circuit of FIG. 5 is constituted as follows. A video signal from the input terminal 12 is led to a video signal amplifier 13 and a synchronization signal separator 14, the output of which is given to a sampling pulse generator 15 and a synchronization signal generator 19. A memory circuit 16 receives a time sequential signal from the video amplifier 13 and sample-holds it in order for conversion to the parallel type video signal by a multiplexer circuit 17. That is, the multiplexer circuit 17 takes out memorized video signal from the memory 16 and rearranges it into the N (e.g. 107) parallel signals, in each of which n (e.g. 3) data in the memory 16 are rearranged into a time sequential signal to take the time period of H. The parallel outputs of the multiplexer circuit 17 are given through amplifiers 18 to the control electrodes 4, 4', of the display apparatus of FIGS. 3(a) and 3(b). Horizontal deflection signal generator 20' and vertical deflection signal generator 22' receive a signal from the synchronization signal generator 19 and issue a horizontal deflection signal and vertical deflection signal through the amplifiers 21 and 23 to the horizontal deflection electrodes 7, 7' and vertical deflection electrodes 6, 6' of the display apparatus, respectively. A cathode control circuit 24 receives a signal from the synchronization signal generator and issues a control signal to the linear thermionic cathodes 1, in order that electrons from selected ones of the linear thermionic cathodes 1 selectively form electron beams for the period of m×H by application of a negative potential thereto, so as to allow scanning for the period of m×H, where m is a number of horizontal scannings made by each linear thermionic cathode, for example m=5.

Figure 4:
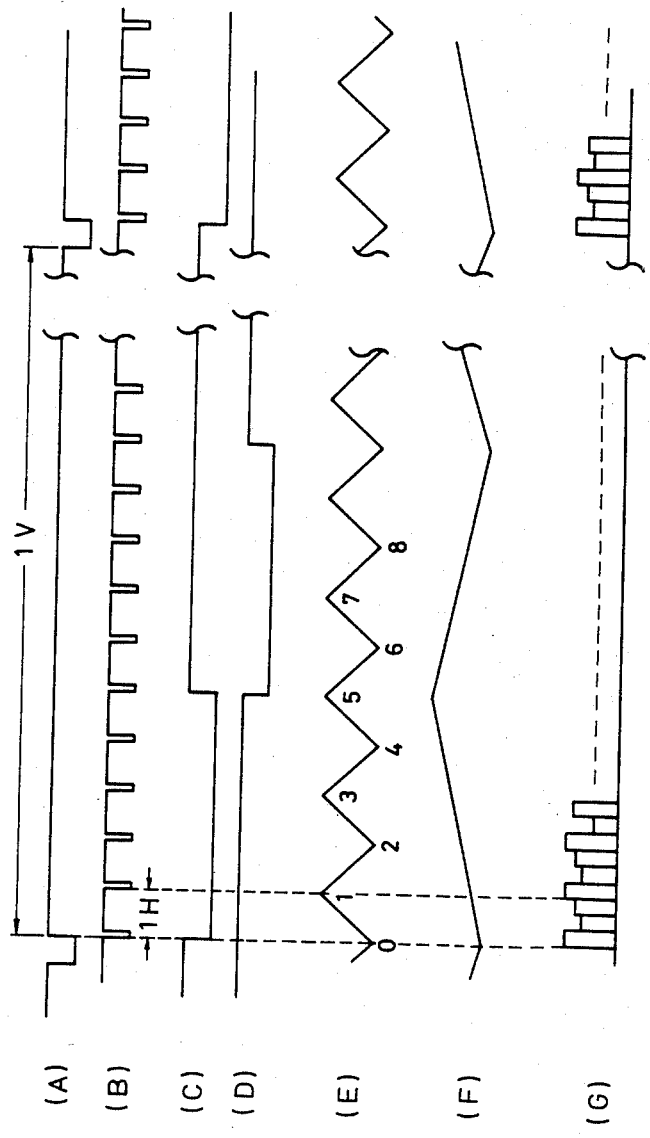
FIG. 4 is a waveform chart showing waveforms of signals at various parts of the apparatus of FIG. 3.

FIG. 4 shows waveforms (A), (B), (C), (D), (E), (F) and (G) of various parts of the FIG. 5 circuit for the example of n=3 and m=5. The waveforms (A) and (B) are those of horizontal synchronizations signal and vertical synchronization signal, wherein H shows the time period of one horizontal scanning and V shows the time period of one vertical scanning. The waveform (C) and (D) are voltages to be applied to a selected one and the others of the linear thermionic cathodes, respectively for switchingly operating the cathodes in sequence. The waveform (E) is issued from the horizontal deflection signal generator circuit 20', and the waveform (F) is of an example of the vertical deflection signal generator circuit 22', respectively, and the waveform (G) is the control signal to be applied from the circuit 18 to the control electrodes 4 of the display apparatus.

Figure 10:
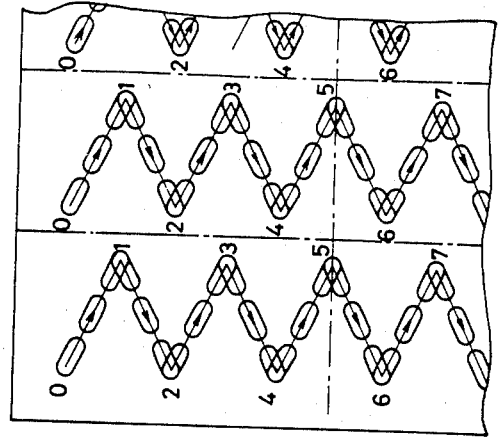
FIGS. 10a–10d illustrate the manner of scanning the abovementioned various apparatuses.
Figure 10:
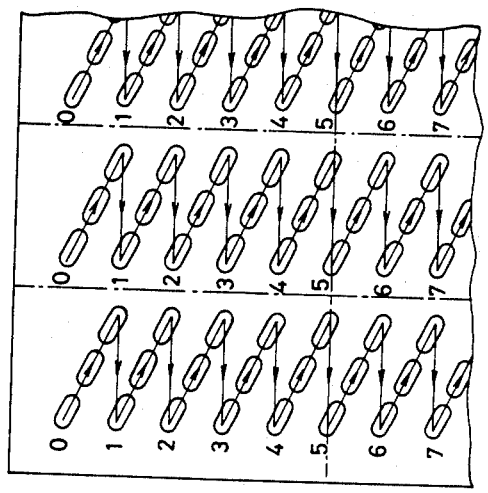
Figure 10:
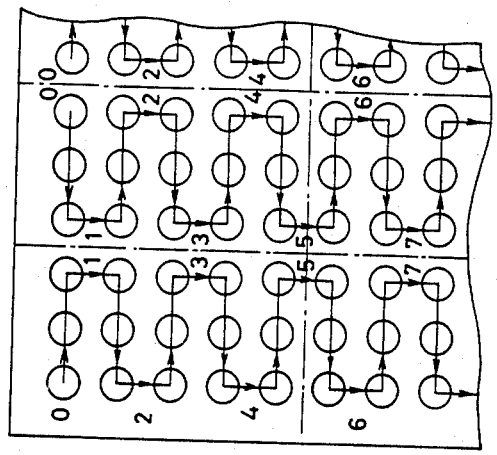
Figure 10:
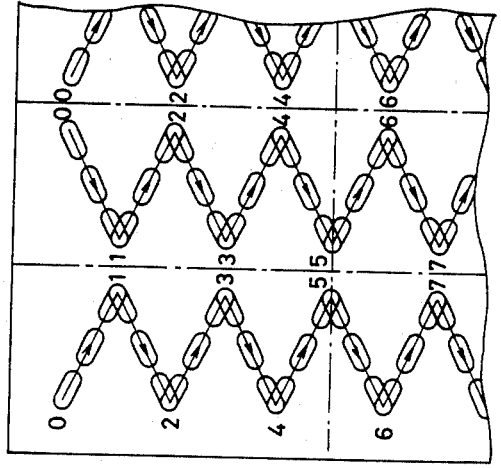

In the operation of the picture image display apparatus of multiple electron beam type having the abovementioned construction, scannings of beam spots on the phosphor screen 10 are made in the known line at a time type scanning, wherein an ordinary time-sequential image signal is converted into a plural number of parallel signals. For example, in the abovementioned case to display an image field raster having numbers of picture elements of 240 (in vertical direction) times 321 (in horizontal direction), with regard to the horizontal scanning of the beam spots the raster is divided into a plural number N of vertically oblong sections, wherein the horizontal scannings are carried out parallelly in all of N sections. Then, each section has picture elements of n=321/N in the horizontal direction. For example, when the number N of the vertical sections is 107, the number n in horizontal scanning of picture element in each section is 3. For such example, 107 beam spots are produced from each linear thermionic cathode 1, and 107 control electrodes 4 are provided in order to control the 107 electron beam intensities. In the apparatus, the horizontal scanning is made by using a triangular wave as shown in FIG. 4 (E) having a horizontal period of 2H in 1 cycle, which comprises a first scanning period of 1H wherein the voltage increases and a second scanning period of 1H wherein the voltage decreases. The triangular wave is applied across the pairs of the horizontal deflection electrodes 7, 7'. Since all the deflection spaces are defined by the deflection electrodes 7, 7' disposed and connected in the same order, all the N beam spots are simultaneously deflected to scan in the same direction in the first scanning period H, and in the next period H they are deflected to scan in the direction opposite to that of the scanning in the first scanning direction. Therefore, the scannings of the beam spots seen at an enlarged part of the phosphor screen is as shown in FIG. 10(b). The horizontal scanning period H is equal to the horizontal scanning period of the ordinary time sequential television signal. In order for attaining such line-at-a-time scanning, the ordinary time sequential image signal is preliminarily converted into the N parallel signals of the line-at-a-time type. As shown in FIG. 4 (B) and (E), the triangular wave to be applied to the horizontal deflection electrodes alternately increases and decreases its voltage, and each of the increasing period and the decreasing period has the horizontal scanning period H. That is, the scannings of the beam spots change its direction between odd number 1H periods and even number 1H periods. Therefore, the contents of the video signal to be applied to the control electrodes 4 must be preliminarily inversed for the leftwards scanning.

Figure 1:
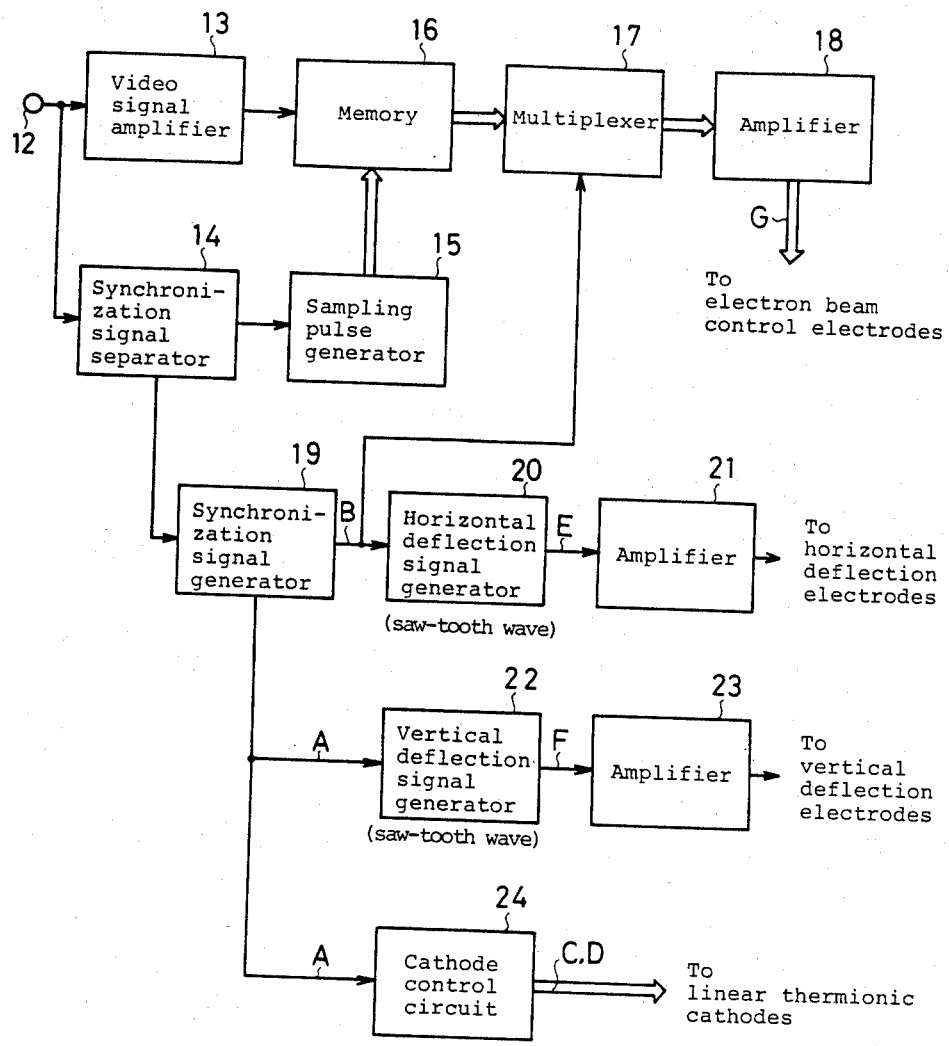
FIG. 1 is a circuit diagram of a hitherto proposed picture image display apparatus.
Figure 7A:
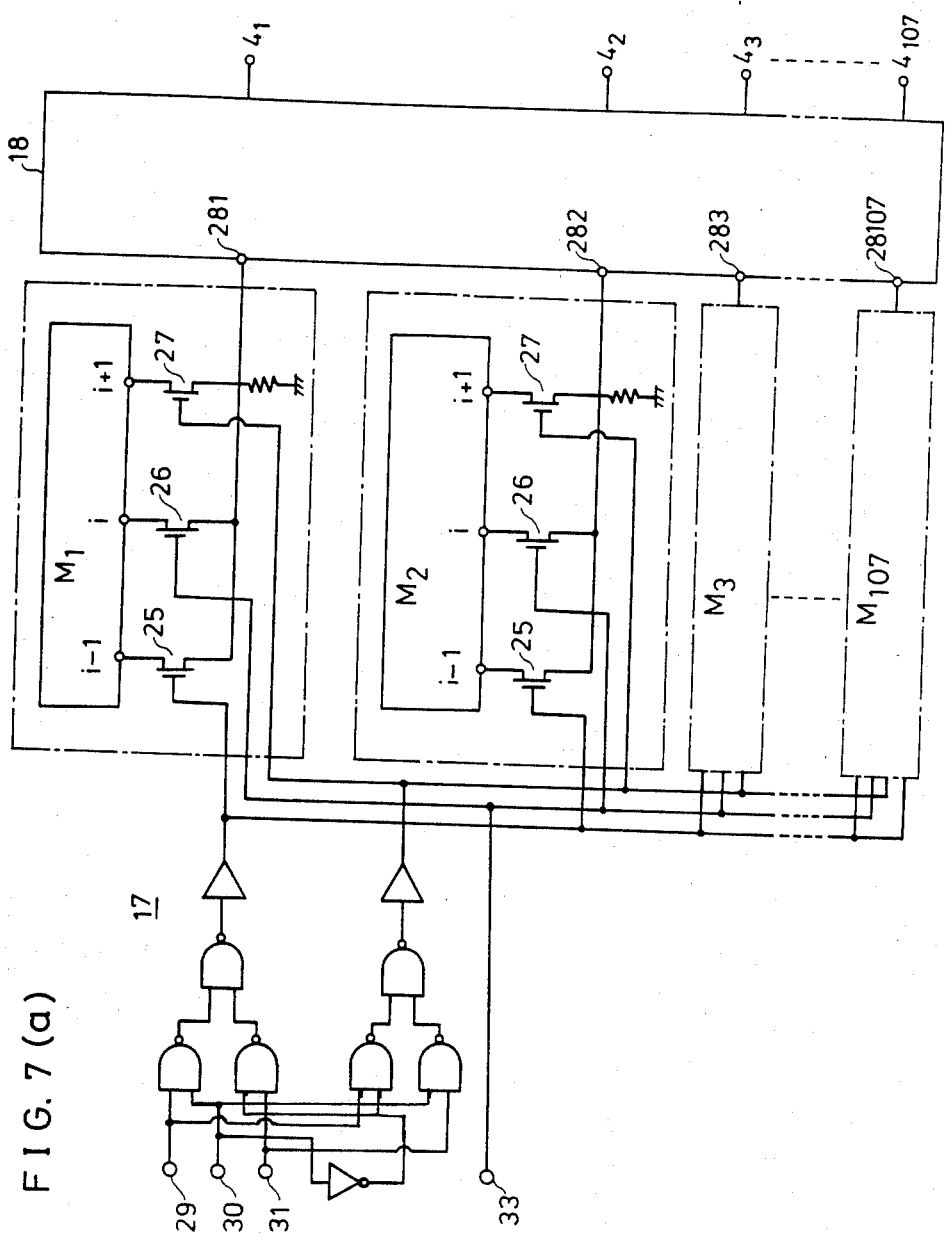
FIG. 7(a) is a circuit diagram of the multiplexer of the example circuit.

FIG. 6 is a waveform chart showing waveforms for use in the multiplexer circuit 17 of FIG. 5 to be operated under the condition of n=3 and m=5. And FIG. 7(a) shows an example of circuit construction of the multiplexer circuit 17. In the waveform chart of FIG. 6, the waveform (B) is the horizontal synchronization signal of television signal like the waveforms (B) of FIG. 4 and 1H represent one horizontal scanning period of the television signal. The signals (29), (30), (31) and (33) are signals to be impressed on the input terminals of the same number. The waveform (29), (33) and (31) are produced by known multivibrators or oscillators by using a signal (30) produced by dividing the horizontal synchronization signal of (B). The signals $(i-1)$, (i) and $(i+1)$ of FIG. 6 are signals to be impressed from the multiplexer circuit 17 to the read out terminals of the memories $M_1$, $M_2$ .... The waveforms $V_{i-1}$, $V_i$ and $V_{i+1}$ having amplitudes a, b and c show sample-hold levels of the video signal sampled by using a sampling pulse having the frequency of about 6 MH, which is given by dividing the number of picture elements 321 by the substantial horizontal scanning time of the time horizontal synchronization signal. Under a premise that in all the N-divided sections the video signal has the amplitudes a, b and c for three picture elements disposed from left to right of the section, the rearranged video signals of (281), (282) ... of FIG. 6 are produced by the multiplexer circuit 17 and given as the control signals for the first, second, . . . control electrodes, respectively. At the drains of the MOS transistors 25, 26 and 27, the sample-held video signals of the amplitudes a, b and c appear, and accordingly the signals of the waveforms (281), (282) . . . are issued to the input terminals (281), (282) ... of the composite amplifier 18, which parallelly impresses amplified output signals on the control electrode $4_1$, $4_2$ ... $4_{107}$.

The vertical scanning of the apparatus is made by dividing the raster into a plural number M sections from the top to the bottom, and at first in the first section, for example in the uppermost section, the plural number of beam spots, which simultaneously scan, also scan vertically (downwards). When the vertical scanning in the first section is over and all the beam spots reach the bottoms of the first horizontally oblong sections, then the extraction of electron beams from the electrons from the first linear thermionic cathode ends and the extraction of electron beams from the electrons from the second linear thermionic cathode starts by means of switching of cathode control signal applied to the cathodes 1, and the vertical scannings of the beam spots start in the second-from-the-top section and scan downwards in the same way as in the first-from-the-top section. The vertical scanning is made thus downwards to the bottom or M-th section by applying an ordinary saw-tooth wave having a period V of the vertical scanning period of the ordinary television signal. For the abovementioned example of the raster having the number of vertical picture elements of 240, when the number M of the horizontally oblong sections is 48, each of the section has the horizontal scanning lines of the number of $n = 240/48 = 5$. That is to say, in the case of the example apparatus using 48 linear thermionic cathodes, each cathode vertically scans to perform 5 lines of horizontal scannings.

Figure 7B:
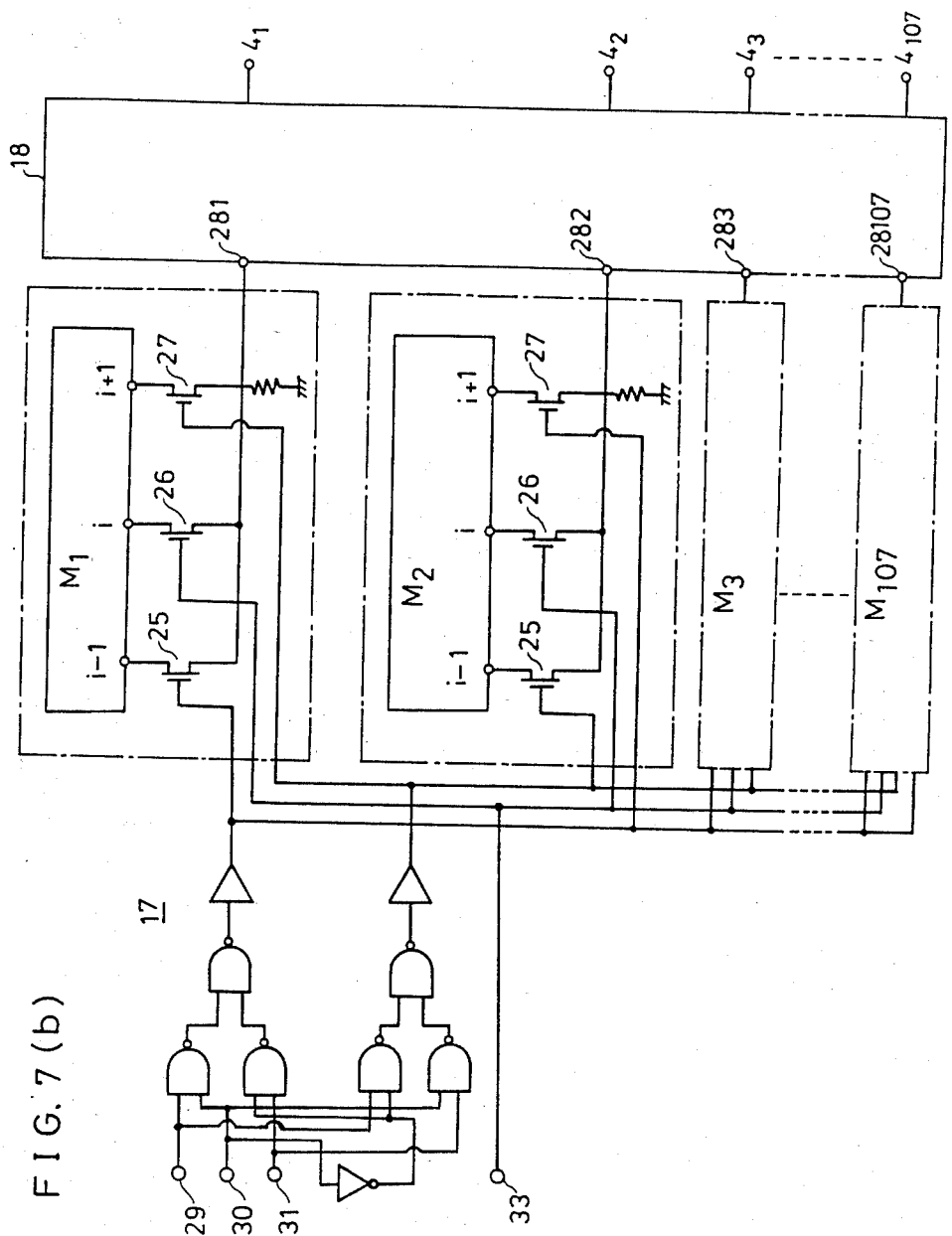
FIG. 7(b) is a circuit diagram of the multiplexer of a modified example circuit.
Figure 8A:
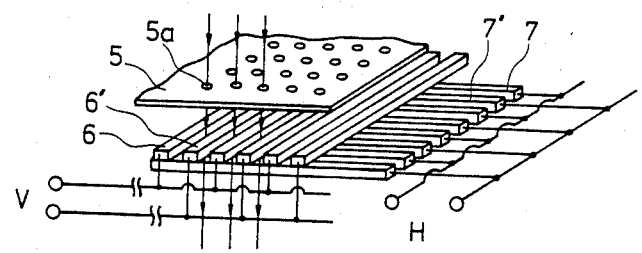
FIG. 8(a) is an exploded perspective view showing the principal part of a modified display apparatus in accordance with the present invention.
Figure 8B:
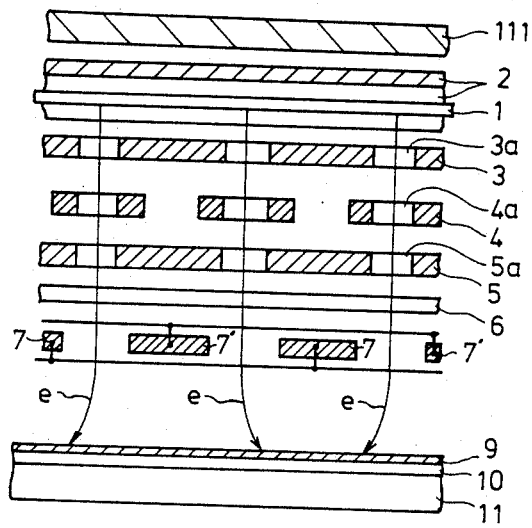
FIG. 8(b) is a sectional view of the apparatus of FIG. 8(a).

FIG. 8(a) and FIG. 8(b) show the characterizing part of another example, wherein the number of deflection electrodes is halved from that of FIG. 3, thereby enabling reducing inter-electrodes capacitance of the deflection electrodes. As shown by FIG. 8(a) and FIG. 8(b), the deflection electrodes 6, 6' as well as 7, 7' are disposed to form such pairs that the electron beams pass through every gap formed by the neighboring deflection electrodes. This is contradistinctive to the example shown by FIG. 3(b), where every electron beam passes through the gaps of the electric field of the same direction, that is the gaps having the first horizontal deflection electrodes on the left side and the second horizontal deflection electrodes on the right side, thereby deflecting every electron beam to the same directions (leftwards). By the abovementioned configuration of FIG. 8(b), neighboring electron beams pass electric fields of opposite directions. That is, the deflection electrodes are disposed with the uniform gaps and every gaps are disposed below the electron beam passing apertures and openings, so that the electron beams pass every neighboring gaps which has opposite electric field to that of the neighboring gaps. Therefore, every neighboring gaps have symmetric electric fields to each other. Accordingly the electron beams e, e . . . in neighboring gaps of the deflection electrodes are deflected substantially symmetrically to each other as shown in FIG. 8(b). As a result of this symmetric scanning of neighboring sections, the scanning is made as shown by FIG. 10(c). Therefore, for producing a video signal for the scanning in the even numbered sections, i.e., 2nd, 4th . . . 106th sections, the control signal must be reversed with respect to its time order. In order to produce such reversed signal for the even order control electrode, the multiplexer circuit 17 is modified as shown in FIG. 7(b), wherein the connection of the gates of the MOS FETs 25 and 27 for the even order control electrodes are inversed from those of the other orders. Thereby, the control signal (282') of FIG. 6 which is a reversal of the time to that of the signal (282) of FIG. 6 is obtainable.

The vertical scanning of the apparatus of FIG. 7(a) and FIG. 7(b) is elucidated hereafter. Similar to the horizontal deflection electrodes 7, 7' the vertical deflection electrodes 6, 6' of FIG. 7(a) and FIG. 7(b) are constructed such that the electrodes 6, 6' are disposed with uniform gaps and every gaps are disposed below the electron beam passing apertures and openings, so that every neighboring gaps have symmetric electric fields to each other. Then, the vertical deflection voltage having the waveform (F) of FIG. 4 is impressed across the vertical deflection electrode 6 and 6'. Then, when the first (the top) linear thermionic cathode is impressed by a negative pulse signal, electron beams from the first cathode are taken out through the apertures and openings 3a, 4a and 5a and the electron beams pass through the first (the top) gap between the vertical deflection electrodes 6 and 6'. When the electrode 6 is positive against the electrode 6' at first and changes gradually to negative by the impression of the vertical deflection signal voltage of the triangular waveform of FIG. 4 (E), then the electron beam spots runs downwards by the vertical scanning from each top of the first vertical sections to the bottoms thereof also scanning horizontally by the triangular wave. Accordingly the beam spots run down in zigzag course as shown by FIG. 10(c). When the scanning beam spots reach the bottom positions indicated by numeral (5) of the first vertically divided sections in FIG. 10(c), the electron beams from the first linear cathode are extinguished in compliance with a control signal from the circuit 24, and at the same time, electrons from the second linear cathode starts to form electron beams. And at that time in the second vertically divided sections, the beam spots produced by the electron beam from the second linear cathode just comes to the top positions of the second sections which are the same position (5) of FIG. 10(c), by means of the deflection electric field applied to the gap between the electrodes 6' and 6. That is, in the apparatus of FIG. 8(a), the relation between the vertical electrodes 6 and 6' and the electron beams is similar to that for the horizontal electrodes 7, 7' of FIG. 8(b), and therefore, the deflections of the electron beams in the vertical directions are symmetrical between the vertically neighboring sections. Accordingly, when a beam spots scans and reaches the bottom of a section, a beam spot of the lower section also reaches the top position thereof. Therefore, by relaying the operation of the electron beam formings sequentially downwards at the time when the beam spot in a vertical section reaches its bottom, the overall appearances of the beam spots become such that as if the beam spots continuously scan down passing the vertical section boundaries. And thus, the beam spots scan downwards in the second divided sections and thereafter. In the same way the beam spots from the subsequent cathodes follow the scanning in their own vertically divided sections.

In the abovementioned example of FIG. 8(a) and FIG. 8(b), the scanning can be satisfactorily made by using simple triangular waves and using half the number of deflection electrodes. Therefore, the power to generate the scanning signal can be considerably reduced in comparison with the case of using a saw-tooth wave having sharp falling down parts, and the stray capacitance between the deflection electrodes can be remarkably reduced.

In the abovementioned examples, the numbers n and m are selected $n = 3$ and $m = 5$. But these numbers can be selected in other combinations, for example $n = 6$ and $m = 15$ and so on.

Figure 9:
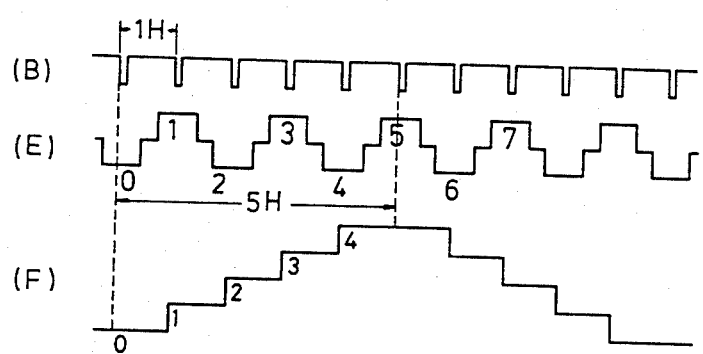
FIG. 9 is a waveform chart showing the waveforms of the signals of principal parts of the apparatus of FIG. 8.

FIG. 9 shows a modified example wherein said horizontal deflection signal generator 20' and said vertical deflection signal generator 22' are formed to issue deflection signals of step waves (E) and (F) of FIG. 9, respectively. Waveform (B) of FIG. 9 is the horizontal synchronization signal. It is known that such step waveform signals are generated by use of known up-down counters and D/A converters. By use of the horizontal deflection signal and vertical deflection signal having such step waveform signals, the scannings of the beam spots are as shown in FIG. 10(d), that is, the spots move stepwise stopping for necessary short times on ideal scanning locus formed with horizontal and vertical lines. Accordingly, the spots are formed with clear dot shape and move very accurately without making overlapping of spots like dot-matrix type panel display apparatus. Therefore, when the dots on the phosphor screen are RGB phosphor dots, a high color saturation is attainable by the accurate scanning.

In the application of the deflection signal across the deflection electrodes, both the first way of fixing potentials of a first kind electrodes 6 or 7 to a predetermined constant potential and impressing the signals on the second kind of them 6' or 7', or the second way of impressing the signal across both electrode 6 and 6' or 7 and 7' retaining the central (averaged) potential thereof constant can be usable.

As has been elucidated in detail, the picture image display device in accordance with the present invention uses at least for its horizontal deflection signal the scanning signal having a voltage increasing first period and a voltage decreasing second period of the same length in 1 cycle, and in both of these periods the control signal is applied to said control electrode, thereby utilizing both the voltage increasing period and the voltage decreasing period for displaying the picture image. Therefore the scanning signal driving circuit needs not have a very short retracing period as necessitated in the prior art apparatus using the saw-tooth wave for horizontal deflection. This leads to decreasing of deflection power and dispensing with of expensive emitter follower circuit or single-ended pushpull amplifiers for the deflection signal circuit.

What is claimed is:

1. A picture image display apparatus comprising:
   a flat type vacuum enclosure having a transparent face panel,
   a row of parallelly disposed linear thermionic cathodes,
   an electron beam extractor electrode which produces a predetermined number of two dimensionally disposed electron beams out of the electron emission from said linear thermionic cathodes,
   a row of control electrodes disposed parallelly in a direction perpendicular to those of said linear thermionic cathodes,
   a row of deflection electrodes,
   a phosphor screen formed on the inner face of said face panel,
   an anode of thin metal film formed on said surface of said phosphor screen,
   a deflection signal generator which issues a deflection signal to be applied to said deflection electrodes, and
   circuits for producing control signals to be applied to said control electrodes, said circuits comprising a memory for storing a video signal and a multiplexer for converting said stored video signal into parallel signals for said control electrodes,
   wherein the improvement is that
   said deflection signal generator issues a deflection signal having two scanning periods of substantially the same length during 1 cycle and comprising a first scanning period wherein voltage increases and a second scanning period wherein voltage decreases, in both of said first scanning period and second scanning period said control signals being applied to said control electrodes to produce image spots in both scanning periods.

2. A picture image display apparatus in accordance with claim 1, wherein said deflection signal is a triangular signal.

3. A picture image display apparatus in accordance with claim 1, wherein said deflection signal has step-shaped waveform having at least two levels in each scanning period.

4. A picture image display apparatus in accordance with claim 1, wherein said control electrodes are impressed with control signals in a manner than alternate control electrodes receive a control signal formed by converting the video signal into parallel signals and the other alternate control electrodes receive a control signal formed by converting the video signal into parallel signals of reversed time sequence.

5. A picture image display apparatus comprising:
   a flat type vacuum enclosure having a transparent face panel,
   a row of parallelly disposed linear thermionic cathodes,
   electron beam forming electrode which produces a predetermined number of two dimensionally disposed electron beams out of the electron emission from said linear thermionic cathodes,
   a row of control electrodes disposed parallelly in a direction perpendicular to those of said linear thermionic cathodes,
   a row of vertical deflection electrodes,
   a row of horizontal deflection electrodes,
   a phosphor screen formed on the inner face of said face panel,
   an anode of thin metal film formed on said surface of said phosphor screen,
   a horizontal deflection signal generator which issues horizontal deflection signal to be applied to said horizontal deflection electrodes,
   a vertical deflection signal generator which issues vertical deflection signal to said vertical deflection electrodes, and
   circuits for producing control signals to be applied to said control electrodes, said circuits comprising a memory for storing video signal and a multiplexer for converting said stored video signal into parallel signals for said control electrodes,
   wherein the improvement is that
   said horizontal deflection signal generator issues a horizontal deflection signal having two scanning periods of substantially the same length during 1 cycle and comprising a first scanning period wherein voltage increases and a second scanning period wherein voltage decreases, in both of said first scanning period and second scanning period said control signals being applied to said control electrodes to produce image spots in both scanning periods.

6. A picture image display apparatus in accordance with claim 5, wherein at least said horizontal deflection signal is a triangular signal.

7. A picture image display apparatus in accordance with claim 5, wherein at least said horizontal deflection signal has step-shaped waveform having at least two levels in each scanning period.

8. A picture image display apparatus in accordance with claim 5, 6 or 7, wherein alternate horizontal deflection electrodes are impressed with a D.C. potential and the other alternate horizontal deflection electrodes are impressed with said deflection signal.

9. A picture image display apparatus in accordance with claim 5, 6 or 7, wherein alternate vertical deflection electrodes are impressed with a D.C. potential and the other alternate vertical deflection electrodes are impressed with said deflection signal.

10. A picture image display apparatus comprising:
   a flat type vacuum enclosure having a transparent face panel,
   a row of parallelly disposed linear thermionic cathodes,
   an electron beam extractor electrode which produces a predetermined number of two dimensionally disposed electron beams out of the electron emission from said linear thermionic cathodes,
   a row of control electrodes disposed parallelly in a direction perpendicular to those of said linear thermionic cathodes,
   a row of vertical deflection electrodes,
   a row of horizontal deflection electrodes,
   a phosphor screen formed on the inner face of said face panel,
   an anode of thin metal film formed on said surface of said phosphor screen,
   a horizontal deflection signal generator which issues horizontal deflection signal for said horizontal deflection electrodes,
   a vertical deflection signal generator which issues a vertical deflection signal for said vertical deflection electrodes, and
   circuits for producing control signals to be applied to said control electrodes, said circuits comprising a memory for storing a video signal and a multiplexer for converting said stored video signal into parallel signals for said control electrodes,
   wherein the improvement is that
   said row of horizontal deflection electrodes comprises a plural number of first electrodes and a plural number of second electrodes alternatingly and parallelly disposed in a manner that gaps are formed inbetween, and one row of said electron beams are formed to pass through corresponding one gap, said first electrodes being electrically connected with each other and said second electrodes being electrically connected with each other and said horizontal deflection signal being impressed across the first electrodes and the second electrodes,
   said horizontal deflection signal generator issues a horizontal deflection signal having two scanning periods of substantially the same length during 1 cycle and comprising a first scanning period wherein voltage increases and a second scanning period wherein voltage decreases, in both of said first scanning period and second scanning period said control signals being applied to said control electrodes to produce image spots in both scanning periods, and
   said control electrodes are impressed with control signals in a manner that alternate control electrodes receive a control signal formed by converting the video signal into parallel signals, and
   the other alternate control electrodes receive a control signal formed by converting the video signal into parallel signals of reversed time sequence.

11. A picture image display apparatus in accordance with claim 10, wherein said deflection signal is a triangular signal.

12. A picture image display apparatus in accordance with claim 10, wherein said deflection signal has step-shaped waveform having at least two levels in each scanning period.

13. A picture image display apparatus in accordance with claim 1, wherein
   said control electrodes are impressed with control signals in a manner that alternate control electrodes receive a control signal formed by converting the video signal into parallel signals, and the other alternate control electrodes receive a control signal formed by converging the video signal into parallel signals of reversed time sequence,
   said deflection electrodes are impressed with a deflection signal wherein an initial potential of a period of deflection is equal to the last potential of the immediately foregoing period of deflection.

* * * * *